US010230616B2

United States Patent
Nguyen (10) Patent No.: US 10,230,616 B2
(45) Date of Patent: *Mar. 12, 2019

(54) MONITORING VIRTUALIZED NETWORK

(71) Applicant: Gigamon Inc., Santa Clara, CA (US)

(72) Inventor: Hung Nguyen, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,017

(22) Filed: Aug. 16, 2017

(65) Prior Publication Data

US 2017/0373963 A1 Dec. 28, 2017

Related U.S. Application Data

(63) Continuation of application No. 13/560,968, filed on Jul. 27, 2012, now Pat. No. 9,769,049.

(51) Int. Cl.
*H04L 12/26* (2006.01)

(52) U.S. Cl.
CPC ............. *H04L 43/50* (2013.01); *H04L 43/12* (2013.01)

(58) Field of Classification Search
CPC ......... H04L 41/24; H04L 41/26; H04L 43/04; H04L 43/12
See application file for complete search history.

(56) References Cited

U.S. PATENT DOCUMENTS

| | | | |
|---|---|---|---|
| 6,151,322 A | 11/2000 | Viswanath et al. | |
| 6,894,999 B1 | 5/2005 | Acharya et al. | |
| 7,031,325 B1 | 4/2006 | Williams et al. | |
| 7,424,018 B2 | 9/2008 | Gallatin et al. | |
| 7,436,832 B2 | 10/2008 | Gallatin et al. | |
| 7,440,467 B2 | 10/2008 | Gallatin et al. | |

(Continued)

FOREIGN PATENT DOCUMENTS

WO    WO-2010045672 A1 *  4/2010    .......... H04L 63/162

OTHER PUBLICATIONS

International Search Report and Written Opinion dated Oct. 22, 2013 for related PCT Patent Application No. PCT/US2013/052121, dated Oct. 22, 2013.

(Continued)

*Primary Examiner* — Mohamed A Kamara
*Assistant Examiner* — Ryan C Kavleski
(74) *Attorney, Agent, or Firm* — Perkins Coie LLP (57) ABSTRACT

A method of monitoring virtualized network includes receiving information regarding the virtualized network, wherein the information is received at a port of a network switch appliance, receiving a packet at a network port of the network switch appliance, and using the received information to determine whether to process the packet according to a first packet processing scheme or a second packet processing scheme, wherein the first packet processing scheme involves performing header stripping, and performing packet transmission to one of a plurality of instrument ports at the network switch appliance after the header stripping, each of the instrument ports configured for communicatively coupling to a network monitoring instrument, and wherein the second packet processing scheme involves performing packet transmission to one of the plurality of instrument ports at the network switch appliance without performing any header stripping.

28 Claims, 8 Drawing Sheets

(56) References Cited

U.S. PATENT DOCUMENTS

| | | |
|---|---|---|
| 7,792,047 B2 | 9/2010 | Gallatin et al. |
| 2001/0055274 A1 | 12/2001 | Hegge et al. |
| 2002/0054595 A1 | 5/2002 | Ambe et al. |
| 2002/0083470 A1 | 6/2002 | Lu et al. |
| 2004/0153854 A1 | 8/2004 | Agrawal et al. |
| 2004/0267874 A1 | 12/2004 | Westberg et al. |
| 2005/0053073 A1 | 3/2005 | Kloth et al. |
| 2006/0126616 A1 | 6/2006 | Bhatia et al. |
| 2009/0135835 A1 | 5/2009 | Gallatin et al. |
| 2009/0262745 A1 | 10/2009 | Leong et al. |
| 2013/0170490 A1 | 7/2013 | Kreeger et al. |
| 2014/0016501 A1 | 1/2014 | Kamath et al. |

OTHER PUBLICATIONS

Mahalingam, et al., "VXLAN: A Framework for Overlaying Virtualized Layer 2 Networks over Layer 3 Networks", Network Working Group, Aug. 26, 2011, Aug. 26, 2011.

Manral, "Stateless Transport Tunneling (STT): Yet another cloud encapsulation or next-generation VxLAN?", Mar. 22, 2012, Mar. 22, 2012.

\* cited by examiner

MONITORING VIRTUALIZED NETWORK

CROSS-REFERENCE TO RELATED APPLICATION(S)

This application is a continuation of U.S. patent application Ser. No. 13/560,968, filed on Jul. 27, 2012, now U.S. Pat. No. 9,769,049 issued on Sep. 19, 2017, entitled "MONITORING VIRTUALIZED NETWORK", which is incorporated herein by reference in its entirety.

TECHNICAL FIELD

This application relates generally to network switch devices, and more specifically, to systems and methods for monitoring a virtualized network.

BACKGROUND

Network switches have been used to forward packets from one node to another node. Such network switch devices include a first network port for receiving packets from a first node, and a second network port for passing the packets to a second node. Some network switch devices may also include one or more instrument ports for transmitting packets to one or more instruments for monitoring network traffic.

Applicant of the subject application has determined that it may be desirable to have a network switch device that is configured to process both virtualized packets that are associated with a virtualized network, and normal packets that are associated with a non-virtualized network.

SUMMARY

In accordance with some embodiments, a method of monitoring virtualized network includes receiving information regarding the virtualized network, wherein the information is received at a port of a network switch appliance, receiving a packet at a network port of the network switch appliance, and using the received information to determine whether to process the packet according to a first packet processing scheme or a second packet processing scheme, wherein the first packet processing scheme involves performing header stripping, and performing packet transmission to one of a plurality of instrument ports at the network switch appliance after the header stripping, each of the instrument ports configured for communicatively coupling to a network monitoring instrument, and wherein the second packet processing scheme involves performing packet transmission to one of the plurality of instrument ports at the network switch appliance without performing any header stripping.

In accordance with other embodiments, an apparatus communicatively coupled to a network that includes a virtualized network includes a port for receiving information regarding the virtualized network, a network port for receiving a packet, a plurality of instrument ports, each of the instrument ports configured for communicatively coupling to a network monitoring instrument, and a processing unit configured for using the received information to determine whether to process the packet according to a first packet processing scheme or a second packet processing scheme, wherein the first packet processing scheme involves performing header stripping, and performing packet transmission to one of the plurality of instrument ports after the header stripping, and wherein the second packet processing scheme involves performing packet transmission to one of the plurality of instrument ports without performing any header stripping.

In accordance with other embodiments, an apparatus communicatively coupled to a network that includes a virtualized network includes a plurality of network ports for receiving packets, the packets including a first packet having a tunnel format, and a second packet without any tunnel format, a plurality of instrument ports, each of the instrument ports configured for communicatively coupling to a network monitoring instrument, a switch module configured to pass the first packet and the second packet to one or more of the instrument ports, and a processor for performing header stripping for the first packet having the tunnel format before the first packet is passed by the switch module to the one or more of the instrument ports.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

Figure 1:
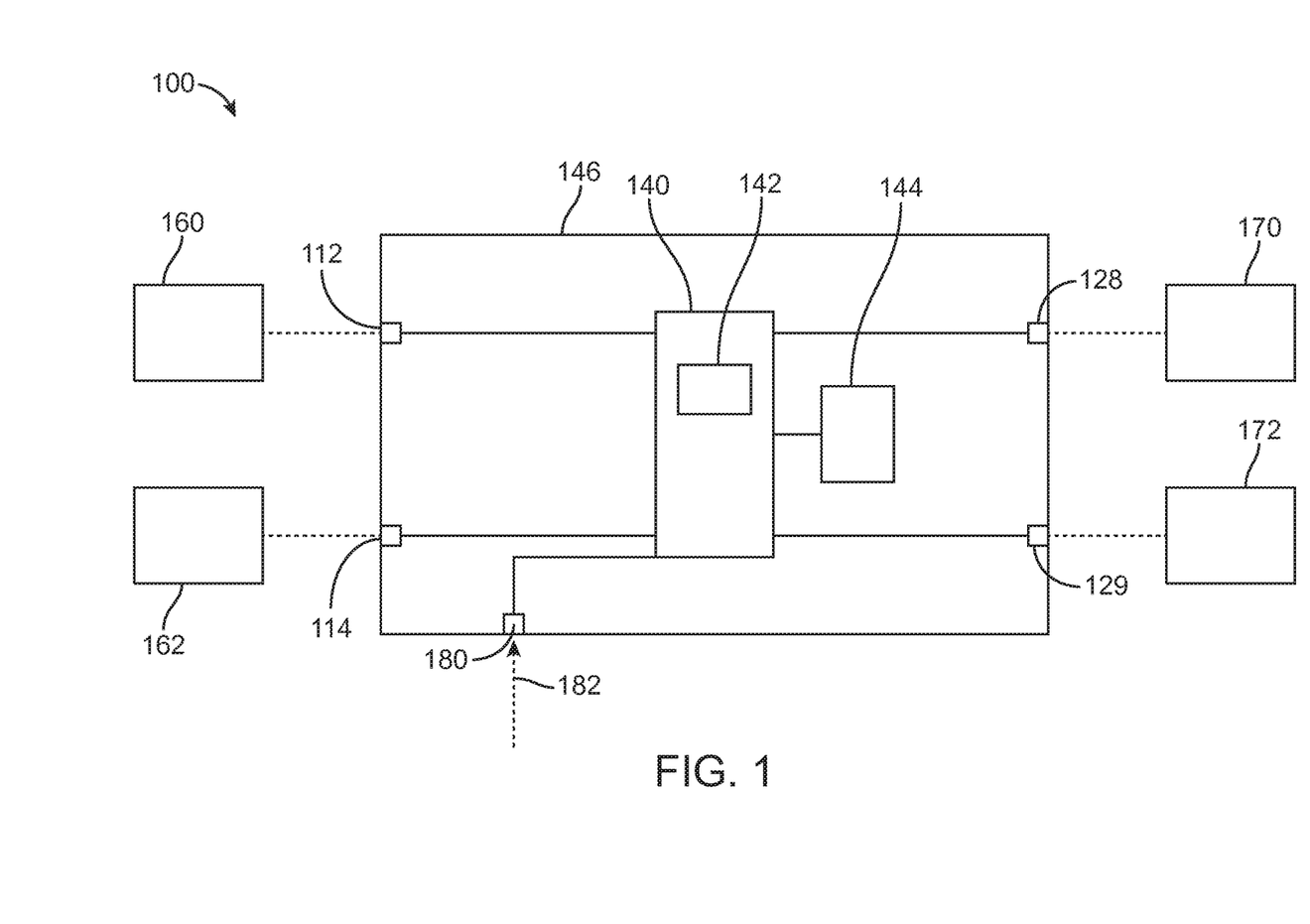
FIG. 1 illustrates a network appliance in accordance with some embodiments.

FIG. 1 illustrates a network switch device 100 in accordance with some embodiments. The network switch device 100 includes a first network port 112, a second network port 114, a first instrument port 128, and a second instrument port 129. The device 100 also includes a packet switch (switch module) 140 with a processing unit 142, a processor 144, and a network switch housing 146 for containing the packet switch 140 and the processor 144. In the illustrated embodiments, the device 100 also includes other components, such as a Network PHY (not shown) coupled to each of the respective ports 112, 114, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports.

During use, the first network port 112 of the device 100 is communicatively coupled (e.g., via a network, such as the Internet) to a first node 160, and the second port 114 is communicatively coupled (e.g., via a network, such as the Internet) to a second node 162. The device 100 is configured to communicate packets between the first and second nodes 160, 162 via the network ports 112, 114. Also, during use, the instrument ports 128, 129 of the device 100 are communicatively coupled to respective instruments 170, 172. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more instruments that are connected to respective instrument port(s) 128, 129. In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only virtualized packets.

In one or more embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 100 after the packets have been processed), such as an intrusion prevention system. In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the device 100 receives the packets, the device 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 140 that may be used to implement features described herein include any of the commercially available network switch devices, such as GigaVUE™, that is available at Gigamon LLC. Other examples of packet switch 140 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the packet switch 140 may be an "out-of-band" network switch, which is configured to obtain packets and pass them to an instrument or to a network that is different from that associated with the original intended destination of the packets.

It should be noted that the packet switch 140 that may be used with the device 100 is not limited to the examples described above, and that other packet switches 140 with different configurations may be used as well. Also, in one or more embodiments described herein, the packet switch 140 may be implemented using an integrated circuit, such as a processor (e.g., a general purpose processor, a network processor, an ASIC processor, a FPGA processor, etc.). Thus, the term "packet switch" or "switch module" may refer to any circuit that is capable of performing the functions described herein, and should not be limited to a switch or a processor.

As shown in the figure, the network switch device 100 further includes a port 180 for receiving information 182 regarding a virtualized network. For examples, the information 182 regarding the virtualized network may be an identification of a virtual machine host, an identification of a virtual machine workload, a mapping between the virtual machine host and the virtual machine workload, or any combination of the foregoing. In some embodiments, the information 182 may be a mapping between an outer header (e.g., the addresses of the source and/or destination VM hosts) and inner header (e.g., the addresses of the actual VM) of a packet that has a tunnel format, wherein the outer header may be due to an encapsulation of an original packet resulted from virtualization technology. The information 182 regarding the virtualized network may be received at the port 180 from a virtualized data center, a virtual machine host, an openflow controller, a network switch, or another device that is communicatively coupled to the port 180. In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the device 100 may include multiple ports 180 for receiving information 182. In some cases, one or more of the ports 180 may be used to implement the network ports 112, 114, thereby allowing the same port(s) 180 for receiving the information 182 to also receive network traffic.

In accordance with some embodiments, the processing unit 142 is configured to receive packets from the network ports 112, 114, and process the packets with respect to the information 182 regarding a virtualized network received at the port 180. In some embodiments, the processing unit 142 may determine that a particular packet is associated with a virtualized network based on the information 182, in which case, the packet switch 140 then processes the packet in accordance with a first packet processing scheme. In other embodiments, the processing unit 142 may determine that a particular packet is not associated with a virtualized network based on the information 182, in which case, the packet switch 140 then processes the packet in accordance with a second packet processing scheme. In some embodiments, the first packet processing scheme may involve performing header stripping on the packet that is associated with a virtualized network using the processor 144, and performing packet transmission to the instrument port 128 and/or the instrument port 129 at the network switch device 100 after the header stripping. Techniques for header stripping will be discussed in further detail below. Also, in some embodiments, the second packet processing scheme may involve performing packet transmission to the instrument port 128 and/or the instrument port 129 at the network switch device 100 without performing any header stripping.

In the illustrated embodiments, the processing unit 142 is illustrated as a component of the packet switch 140. In other embodiments, the processing unit 142 may be a separate component from the packet switch 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. Also, in some embodiments, the packet switch 140 may include ternary content-addressable memory (TCAM). The packet switch 140 may be configured to perform various packet processing functions, included but not limited to packet filtering, packet routing, packet switching, packet mirroring, packet aggregation, etc.

As discussed, the processor 144 may be used to perform header stripping in some embodiments. The processor 144 is communicatively coupled to the packet switch 140. In other embodiments, the processor 144 may be a part of the packet switch 140. Also, in some embodiments, the processor 144 may be a general purpose processor, a network processor, an ASIC processor, a FPGA processor, or any of other types of processor. In other embodiments, the processor 144 may be any hardware, software, or combination thereof, that is configured to perform header stripping (and optionally, other packet processing functions). In the illustrated embodiments, the processor 144 is configured to receive only packets with a tunnel format, such as that used in a virtualized network. In one implementation, the processing unit 142 or the packet switch 140 is configured to pass all packets with a tunnel format to the processor 144, and does not pass packets without any tunnel format (e.g., packets that are not associated with a virtualized network) to the processor 144. Upon receiving a packet with a tunnel format, the processor 144 then removes one or more headers from the packet. By means of non-limiting examples, the processor 144 may be configured to remove an outer MAC header, an outer IP header, an outer UDP header, or any combination of the foregoing, from the packet. Examples of these headers will be discussed below with reference to FIGS. 4A-4B. In other embodiments, in addition to performing packet stripping, the processor 144 may also be configured to perform other packet processing functions on the received packet.

In the illustrated embodiments, after the processor 144 performs header stripping on the packet, the processor 144 then passes the packet back to the packet switch 140. The packet switch 140 then transmits the packet to one or more of the instrument ports 128, 129 according to a pre-determined transmission scheme (e.g., one-to-one, one-to-many, many-to-one, many-to-many, etc.) as discussed previously.

As discussed, the processing unit 142 may determine that a packet is not associated with a virtualized network, in which cases, the processing unit 142 or the packet switch 140 then processes the packet in accordance with the second packet processing scheme in which the packet is passed to one or more of the instrument ports 128, 129 without performing any header stripping. Thus, in the second packet processing scheme, the packet is not passed to the processor 144 for header stripping. Such technique is advantageous because it allows the processor 144 to be dedicated to performing packet processing function(s) (e.g., header stripping) that is appropriate for only packets with tunnel format. As a result, the processor 144 can perform such function(s) very quickly and efficiently, and does not need to spend resources for processing packets to distinguish virtualized network packets from non-virtualized network packets. Also, dedicating the processor 144 for header stripping is advantageous because the packet switch 140 does not need to spend resource to perform header stripping.

Figure 2:
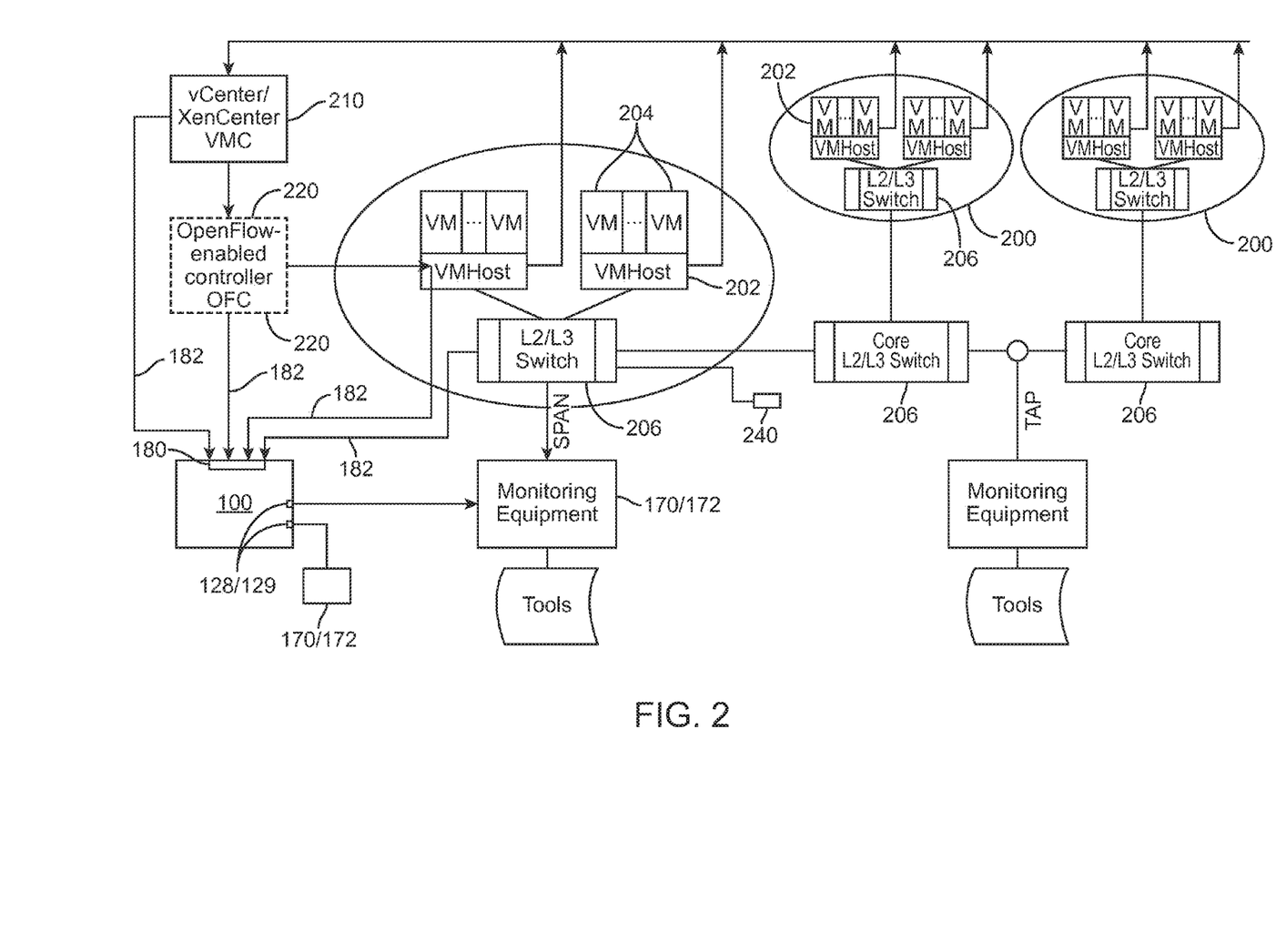
FIG. 2 illustrates the network appliance of FIG. 1 deployed in a network environment in accordance with some embodiments.

As discussed, the port 180 at the network switch device 100 is configured to receive information 182 regarding a virtual network in some embodiments. The information 182 may be received from one or more devices. FIG. 2 illustrates an environment in which the network switch device 100 may be deployed. As shown in the figure, the network environment includes multiple sub-networks 200, wherein each network 200 may include one or more hosts (e.g., VM Host)

202. Also, each of the hosts 202 may include one or more workloads (e.g., virtual machine) 204.

In some embodiments, the port 180 at the network switch device 100 may be configured to receive the information 182 regarding the virtual network directly or indirectly from the host(s) 202. In other embodiments, the port 180 at the network switch device 100 may be configured to receive the information 182 regarding the virtual network directly or indirectly from a switch 206 to which the host(s) 202 is communicatively coupled. The switch 206 may be a L2/L3 switch, or any of other types of switch, in different embodiments. In one implementation, the port 180 may be configured for snooping of signaling traffic used to set up, discover, or map the VM hosts to the VM targets. For example, in VXLAN network technology, IP multicast may be used to send "ARP"-like packets to find the host that hosts a particular VM target. In some network virtualization, such as VXLAN, where the signaling messages are involved for setting up the tunnel information, such signaling messages may be snooped at the L2/L3 switch 206, for reception by the network switch device 100 to obtain the tunnel information without involving a datacenter (e.g., e.g., a vCenter, a XenCenter, etc.) or an OpenFlow controller (OFC).

Also, as shown in the figure, in other embodiments, the port 180 at the network switch device 100 may be configured to receive the information 182 regarding the virtual network directly or indirectly from a datacenter (e.g., a vCenter, a XenCenter, etc.) 210 to which different the hosts 202 from the different networks 200 are communicatively coupled. In one implementation, the port 180 may be used to access the datacenter 210 to retrieve the inventory of VM targets and their relations to the VM hosts. The VM hosts may be managed in the data center(s) 210 by the VM controller, e.g. vCenter or XenCenter (referred to as VMC in the figure). The VMC knows about the hosts, workloads (VMs), and where the workloads are running. It also knows about the network identities of the hosts, and some of the workloads. The VMC may have APIs for third party vendor devices to connect to and get the inventory information, as well VM events, such as when a new workload is started, stopped, or migrated from one host to another host. Thus, any of such information may be obtained from the datacenter 210 using the port 180.

In further embodiments, the port 180 at the network switch device 100 may be configured to receive the information 182 regarding the virtual network directly or indirectly from an OpenFlow enabled controller (OFC) 220. In some cases, tunnel information for a packet may be set up or received by a software-defined-network (SDN) and/or OpenFlow controller. In such cases, the tunnel information may be sent from the SDN and/or OpenFlow switches to a collector, which analyzes tunnel information and provide the information 182 to the network switch device 100. In some embodiments, the OFC and/or the network switch device 100 may subscribe to the VMC to get the information 182 about the virtualized datacenter 210, such as workloads-to-hosts map. In such cases, the information 182 may be obtained from the VMC or from the OFC. For example, in some embodiments where the OFC is employed, the tunnel information (i.e. the mappings between the inner and outer addresses in an encapsulated packet) may be made available to the network switch device 100 by the OFC sending a copy of the open flow message to the network switch device 100.

In other embodiments, such as Nicira/Xen/OpenVSwitch, the OFC may be used to control all the OpenVSwitches in the VM Hosts' hypervisor to set up the tunnel, e.g., via a communication channel between the OFC and the VM Host. In such cases, the switch 206 may be an OpenFlow switch, in which cases, the OpenFlow switch may send a copy the OpenFlow message to the network switch device 100. In other embodiments, the OFC may be optional. Xen's OpenVSwitch is another technology involved in network virtualization. This solution involves using OpenFlow controller to control the OpenFlow-enabled OpenVSwitches to create a tunnel mesh using NVGRE format. Unlike VXLAN, the tunnels of NVGRE format are created by a centralized OpenFlow-enabled controller(s) which knows about the VM hosts and VM workloads. When the OpenVSwitch needs to send traffic from workload A to workload B, if it does not yet know the identity of the VM host that hosts workload B, it will ask the controller, which then sends it the necessary information to create a tunnel between VM host of A and VM host of B. Thus, in some embodiments, the information 182 may be obtained from the controller and/or from the OpenVSwitch.

It should be noted that the information 182 may be received from one device (e.g., device 202, 206, 210, or 220), or from multiple devices (e.g., any combination of the devices 202, 206, 210, and 220).

As shown in the figure, the network switch device 100 may receive a packet that is associated with a virtualized network (such as a packet that is associated with the VM Host 202) at a network port (e.g., port 112/114) or the port 170. The network switch device 100 may also receive a packet that is not associated with any virtualized network (such as a packet from node 240). In some embodiments, the network switch device 100 is configured to use the information 182 to determine whether a received packet is associated with a virtualized network or not.

Figure 3:
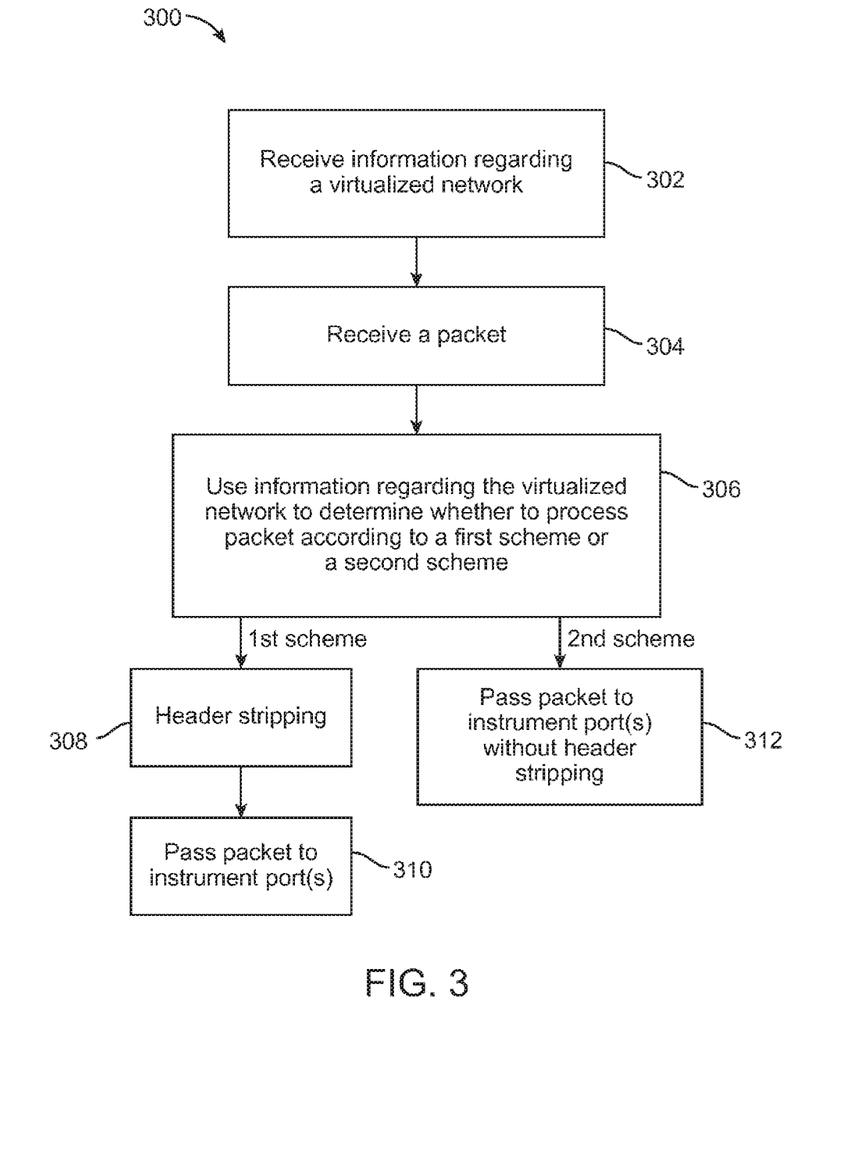
FIG. 3 illustrates a method performed by the network appliance of FIG. 1 in accordance with some embodiments.

FIG. 3 illustrates a method 300 of monitoring a virtualized network that may be performed by the network switch device 100 in accordance with some embodiments. First, the network switch device 100 receives information regarding the virtualized network (Item 302). In the illustrated embodiments, the information regarding the virtualized network may be received at the port 180 (which may be, for example, a port dedicated for receiving the information). The information regarding the virtualized network may be stored in a non-transitory medium in the network switch device 100 in some embodiments. In other embodiments, the information regarding the virtualized network may be stored in a non-transitory medium (e.g., an external hard drive, a server, etc.) outside the network switch device 100, wherein the non-transitory medium is communicatively coupled to the network switch device 100.

As discussed, the information (e.g., the information 182) regarding the virtualized network may be an identification of a virtual machine host, an identification of a virtual machine workload, a mapping between the virtual machine host and the virtual machine workload, or any combination of the foregoing. In some embodiments, the information may be a mapping between an outer header (e.g., the addresses of the source and/or destination VM hosts) and inner header (e.g., the addresses of the actual VM) of a packet that has a tunnel format, wherein the outer header may be due to an encapsulation of an original packet resulted from virtualizaton technology. In other embodiments, the information regarding the virtualized network may be any of other data that may be used to determine whether a given packet is a virtualized packet.

Next, the network switch device 100 receives a packet at a network port, such as the network port 112, or the network port 114 (Item 304). The network switch device 100 then uses the received information 182 regarding the virtualized network to determine whether to process the packet according to a first packet processing scheme or a second packet processing scheme (Item 306). In some embodiments, the first packet processing scheme involves performing header stripping (Item 308), and performing packet transmission to one of a plurality of instrument ports (e.g., instrument ports 128, 129) at the network switch device 100 after the header stripping (Item 310). Also, in some embodiments, the second packet processing scheme involves performing packet transmission to one of the plurality of instrument ports (e.g., instrument ports 128, 129) at the network switch device 100 without performing any header stripping (Item 312).

In some embodiments, when performing the act 306, the processing unit 142 at the network switch device 100 may examine one or more fields in the packet, and may determine if the value(s) in the respective field(s) matches with value(s) in a table that is compiled using the previously received information 182. If the value(s) from the packet matches from the value(s) in the table, then the processing unit 142 may determine that the packet is associated with a virtualized network (e.g., the packet may be from a virtual machine). In such cases, the network switch device 100 then processes the packet according to the first packet processing scheme, in which the processing unit 142 passes the packet to the processor 144, which performs header stripping to remove headers of a tunnel format from the packet. In particular, a packet that is associated with a virtualized network may include a tunnel format that encapsulates the original traffic packet. The encapsulation due to the virtualization may include multiple headers that are added to the original packet. Thus, in the illustrated embodiments, after the processing unit 142 determines that the packet is associated with a virtualized network, the processing unit 142 then passes the packet to the processor 144 to remove the tunnel format so that the packet in its original form may be later processed.

Various techniques may be employed to determine whether a packet has a tunnel format. In one implementation, the table stored in the network switch device 100 (e.g., in a non-transitory medium assessable by the processing unit 142) may include a list of hosts (e.g., host addresses) and corresponding workload. For example, if a virtualized network includes host A supporting virtual machines X1, X2 (workload), and host B supporting virtual machines Y1, Y2, and assuming that it is desirable to monitor traffic between X1 and Y1 using the network switch device 100, then the table may include the following list:

TABLE

| |
|---|
| A, X1 |
| B, Y1 |

The above table may be compiled using the information 182 (e.g., host identifiers (addresses) A, B, and workload identifiers X1, Y1) received from the virtualized network when the workload is set up with the hosts. It should be noted that the host information may be dynamically changing, and therefore, the information stored in the table may also be dynamically changing accordingly. In the above example, after the table is complied, it may later be used to process packets when the network switch device 100 receives the packets. For example, the network switch device 100 may receive a packet with an outer tunnel header that includes the source and destination addresses of the hosts (e.g., A, B). In such cases, the processing unit 142 will look up the table and see if there is a match between the source and destination addresses in the outer tunnel header, and the values in the table. If there is a match (indicating that the packet is a virtualized packet with a tunnel format), the packet will then be passed to the processor 144 to strip the outer header(s).

In other embodiments, in addition to, or in the alternative to, the source and destination addresses in the outer tunnel header, the processing unit 142 may examine other fields in the packet, and look up the table to see if there are matching values in order to determine whether the packet is a virtualized packet (i.e., has a tunnel format). By means of non-limiting examples, the processing unit 142 may look up UDP port number, GRE tunnel label, any of the values in the GRE header, etc., and see if corresponding value(s) may be found in the table lookup. If a virtualized network was set up previously, the above information 182 may be transmitted to the device 100 for storage in the device 100 in table form. Thus, if there is a match, the processing unit 142 may then determine that the packet has a tunnel format.

In another example, the table may include a mapping between the outer header (e.g., the addresses of the source and destination VM hosts) and inner header (e.g., the addresses of the actual VMs which the user cares about). In such cases, the processing unit 142 will pass the packet to the processor 144 for header stripping when the information in the packet matches with the information in the mapping. Such configuration is advantageous because a host may be supporting many virtual machines, and there may be many traffic from the different virtual machines. However, a user may be interested in only traffic between certain virtual machines.

Figure 4A:
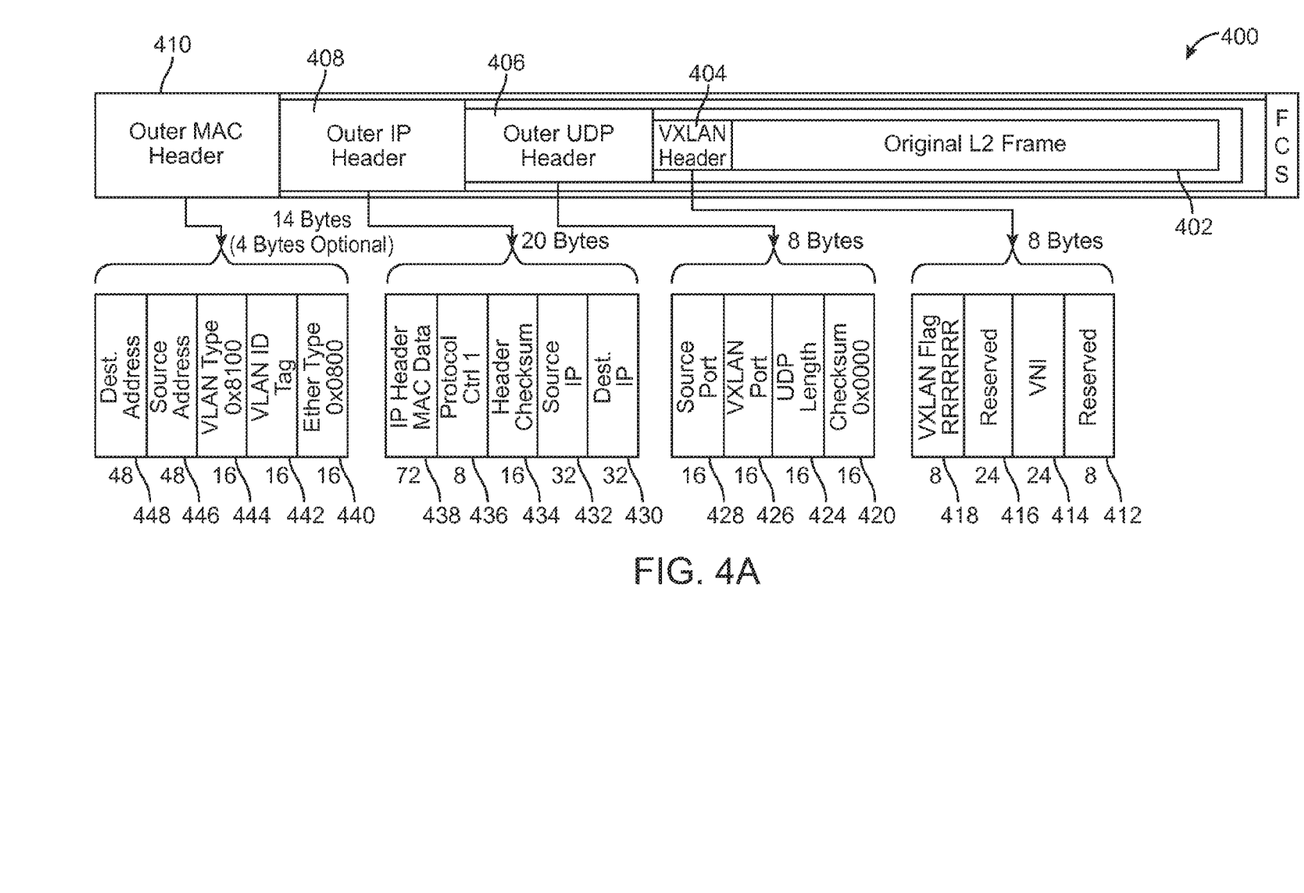
FIG. 4A shows an example of a packet with a tunnel format in accordance with some embodiments.

In some embodiments, a packet with a tunnel format may be a VXLAN packet that encapsulates traffic between the virtualization machine workloads (VM workloads). FIG. 4A illustrates an example of a VXLAN packet 400 in some embodiments. As shown in the figure, the original L2 packet 400 that a virtual machine sends out is encapsulated in the VXLAN header 402 that includes a reserved field 412, a VNI field 414 associated with the VXLAN Segments that the virtual machine belongs to (field for VXLAN network identifier), another reserved field 416, and VXLAN flags field 418. The resulting packet is then wrapped in a UDP→IP→Ethernet packet for final delivery in a network. Thus, VXLAN is a tunneling scheme with the ESX hosts making up the VXLAN Tunnel End Points (VTEP). The VTEPs are responsible for encapsulating the virtual machine traffic in a VXLAN header, and stripping it off and presenting the destination virtual machine with the original L2 packet. As shown in the figure, the encapsulation includes the following modifications from UDP, IP and Ethernet frames: an outer UDP header 406, an outer IP header 408, and an outer MAC header 410. The outer UDP header 406 includes source port field 428, VXLAN port field 426, a UDP length field 424, and an UDP checksum field 420. The outer IP header 408 includes an IP header field 438, a protocol field (for indicating that the frame includes a UDP packet) 436, a header checksum field 434, a source IP field (IP address of originating VXLAN Tunnel End Point (VTEP)) 432, and a destination IP field (IP address of target VTEP) 430. The outer MAC header 410 includes a destination address field (which may be set to a MAC address of the destination VTEP) 448, a source address field 446, a VLAN type field 444, a VLAN ID tag field 442, and an Ethertype field 440.

In some embodiments, when the processor 144 performs header stripping on a packet, the processor 144 removes the outer UDP header 406, the outer IP header 408, and the outer MAC header 410. Also, in some embodiments, the processor 144 removes the VXLAN header as well, to thereby restore the packet to its original format before it was encapsulated.

Figure 4B:
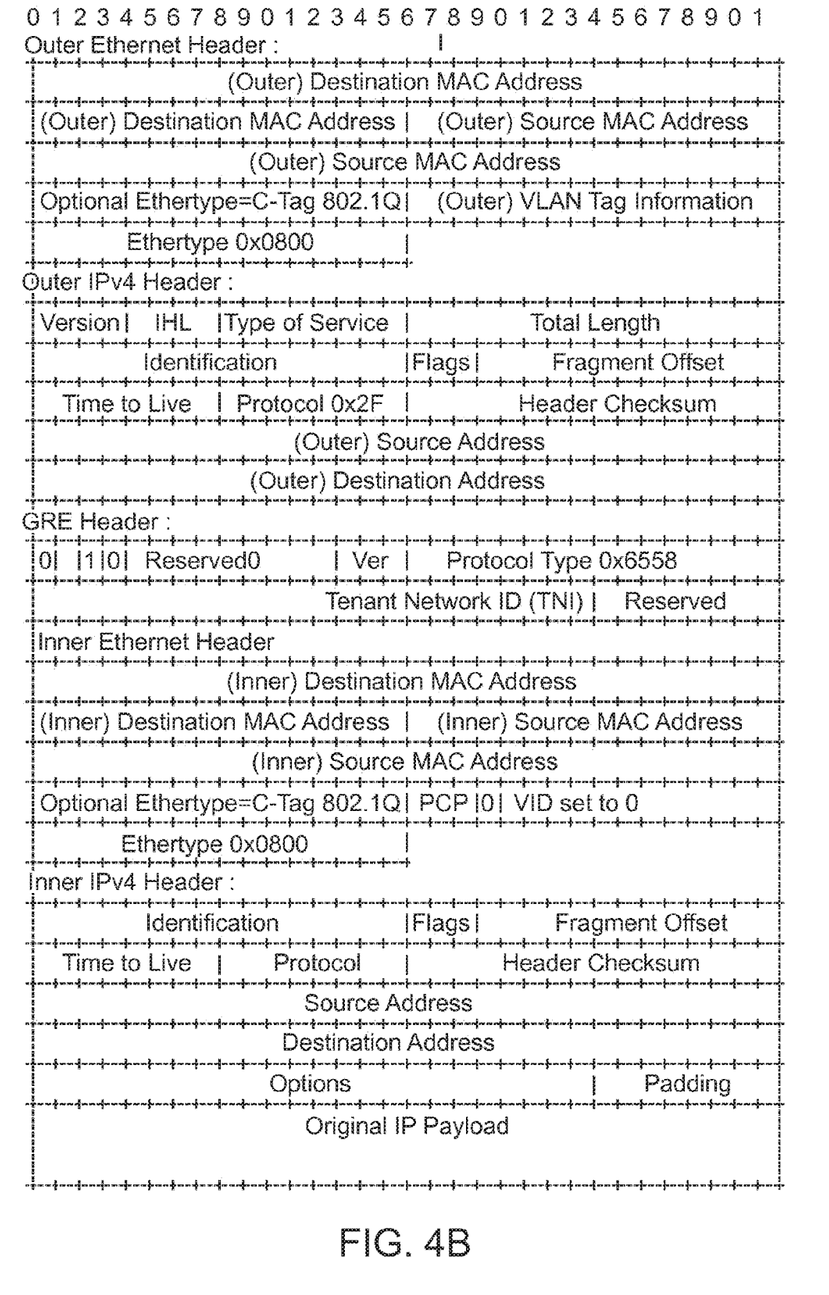
FIG. 4B shows another example of a packet with a tunnel format in accordance with some embodiments.

It should be noted that the tunnel format of a received packet is not limited to the example described, and that a packet received by the network switch device 100 may include other types of tunnel formats, which may have different header(s) encapsulating the original packet. For example, in other embodiments, the packet may have a NVGRE tunnel format (FIG. 4B). Also, in other embodiments, the tunnel format may have other configurations (e.g., it may include other field(s)) that are different from the examples shown in FIGS. 4A, 4B. Thus, as used in this specification, the term "tunnel format" may refer to any format that involves adding additional information (such as header(s)) to the original packet. Also, the term "tunnel header" may refer to any information that is added to the original packet. Also, in other embodiments, the original packet does not need to be a L2 packet, and may be a packet at other levels.

In the first packet processing scheme, after header stripping is performed by the processor 144, the processor 144 then passes the packet downstream for transmission at one or more instrument ports (e.g., instrument port 128 and/or port 129) at the network switch device 100. In some embodiments, the processor 144 may passes the packet back to the packet switch 140, which then processes the packet to one or more instrument ports according to a packet transmission scheme (e.g., transmitting the packet to one or more instrument ports according a one-to-one configuration, one-to-many configuration, many-to-one configuration, many-to-many configuration, etc.). In some embodiments, after the outer header(s) of the packet has been removed by the processor 144, the packet switch 140 then applies filters to the inner header which is the traffic of real interest. The filtered traffic can then be aggregated and/or replicated to the desired instrument ports according to a packet transmission scheme as discussed above. In some embodiments, the packet switch 140 is configured for applying first set of filters based on known outer headers (for virtualized network packets) to identify and discriminate non-virtualized network traffic from virtualized network traffic, to thereby forward the virtualized network traffic to the second packet switch 500 for further process. The packet switch 140 is also configured for applying second set of filters based on original headers (for non-virtualized network packets) to allow the traffic from physical network to be filtered and mapped to instrument ports as discussed before.

In other embodiments, the processing unit 142 at the network switch device 100 may determine, during action 306, that the packet is not associated with a virtualized network. In such cases, the network switch device 100 (e.g., the packet switch 140) then processes the packet according to the second packet processing scheme, in which the packet is transmitted downstream to one or more instrument ports (e.g., instrument port 128 and/or port 129) at the network switch device 100 without performing any header stripping.

As illustrated in the above embodiments, removing the outer header(s) of a tunnel format before passing the packet to a network monitoring instrument is advantageous. This is because existing network monitoring instruments may not understand the tunnel formats. Even if a network monitoring instrument can somehow be modified to understand the formats, it would require additional resources for the instrument to process the tunnel headers. Also, the existing monitoring tools would need to be upgraded to process the original data that is encapsulated in the tunnel format. Embodiments described herein would allow existing network monitoring equipment (without modification) to process the packets even if the packets are encapsulated in a tunnel format when received at the device 100 (because the device 100 is configured to remove the tunnel headers before transmitting the packets to the network monitoring equipment).

Also, allowing the processing unit 142 to first identify packets from a virtualized network before stripping header(s) of the tunnel format associated with the virtualized network is advantageous. This is because network traffic may include a mixed of normal network traffic (e.g., the traditional network traffic) and virtualized network traffic. Accordingly, indiscriminately stripping headers from all traffic without the benefit of the functionalities of the processing unit 142 would not be desirable because this would result in removing header information in the normal network traffic.

In other embodiments, the network switch device 100 may be configured to process only packets from a virtualized network. In such cases, there may be multiple processors 144, with each processor 144 being configured for a respective network port (e.g., network port 112/114) for removing header(s) of the tunnel format for the packet received at the network port. However, such configuration may not be as desirable as the embodiments described with reference to FIGS. 1 and 5 because it would be relatively costly to add a processor (e.g., FPGA or network processor) at every network port of the network switch device 100. Also, it may not be possible, or may be difficult, to add multiple processors for respective network ports for the network switch device 100 if it is already deployed.

In the above embodiments, after header stripping is performed for a packet by the processor 144, the packet is then returned to the packet switch 140 so that the packet switch 140 can process the packet according to a packet transmission scheme (e.g., transmitting the packet to one or more instrument ports according a one-to-one configuration, one-to-many configuration, many-to-one configuration, many-to-many configuration, etc.). Having the separate processor 144 perform heading stripping is advantageous because the processor 144 can do this task non-discriminatively, and therefore in a very efficient manner. Also, the packet switch 140 can perform filtering functions on packets efficiently because it can apply the same filtering functions (those for normal packets) to packets that is received from a virtualized network due to the fact that the processor 144 has removed the encapsulation for these packets.

Figure 5:
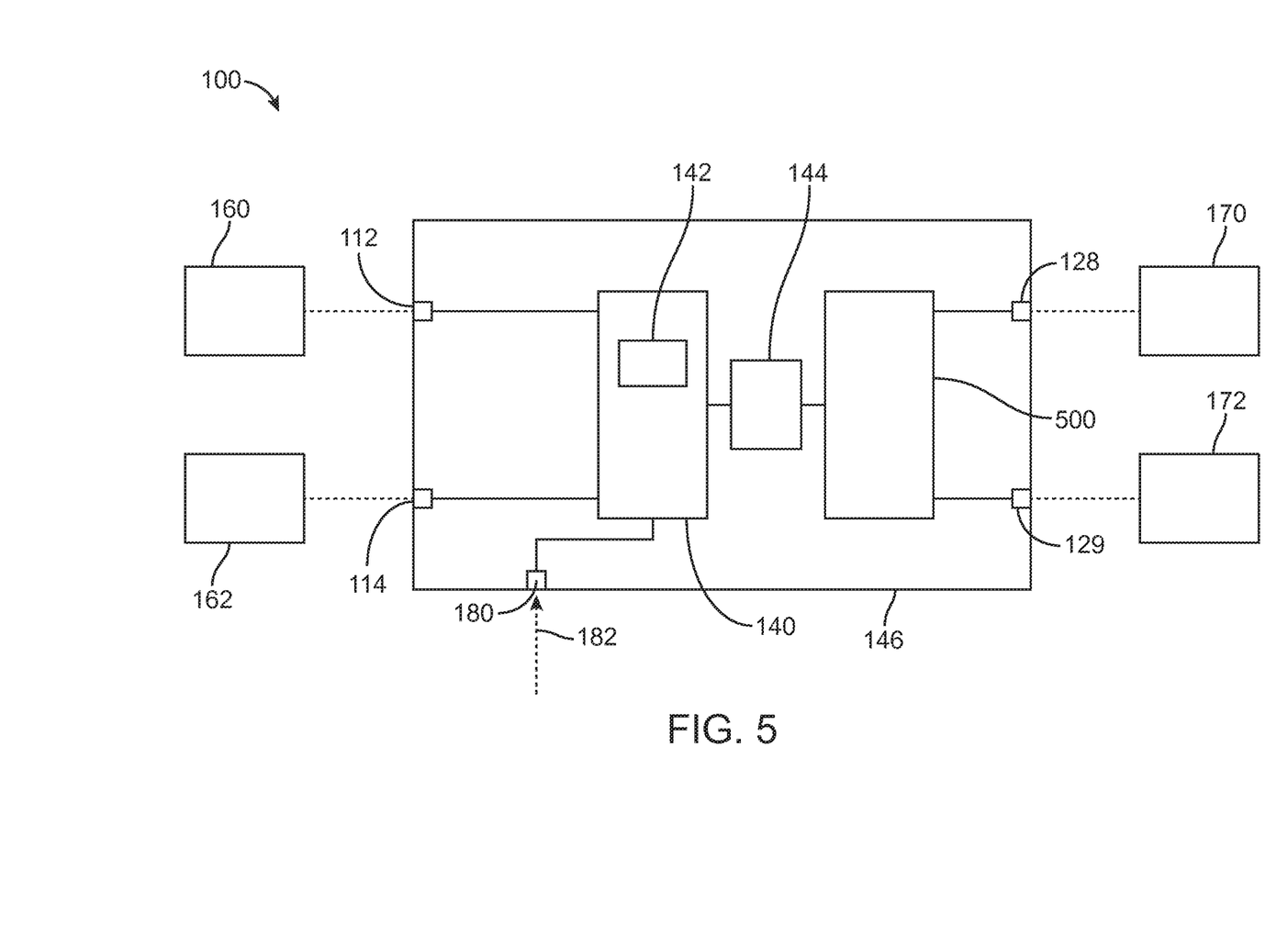
FIG. 5 illustrates another network appliance in accordance with other embodiments.

In other embodiments, instead of returning the packet back to the packet switch 140, after header stripping is performed for the packet by the processor 144, the processor 144 may pass the packet to another packet switch 500 that is different from the packet switch 140 (FIG. 5). In the illustrated embodiments, the network switch device 100 further includes the packet switch 500 for processing the packet according to a packet transmission scheme (e.g., transmitting the packet to one or more instrument ports according a one-to-one configuration, one-to-many configuration, many-to-one configuration, many-to-many configuration, etc.). In such cases, the packet switch 140 is configured to pass packets that do not have any tunnel format to one or more of the instrument ports, and the packet switch 500 is configured to pass packets to one or more of the instrument ports after the headers associated with a tunnel format have been removed from these packets. Thus, the packet switch 500 and the packet switch 140 may be configured to perform some of the same packet processing functions, such as passing of packets to one or more instrument ports according to a packet transmission scheme. In some embodiments, in addition to performing packet transmission, both the packet switch 140 and the packet switch 500 may be configured to filter and replicate traffic. In some embodiments, after the outer header(s) of the packet has been removed by the processor 144, the packet switch 500 then applies filters to the inner header which is the traffic of real interest. The filtered traffic can then be aggregated and/or replicated to the desired instrument ports according to a packet transmission scheme as discussed above.

In some embodiments, the packet switch 140 is configured for applying first set of filters based on known outer headers (for virtualized network packets) to identify and discriminate non-virtualized network traffic from virtualized network traffic, to thereby forward the virtualized network traffic to the processor 144 and the second packet switch 500 for further process. The packet switch 140 is also configured for applying second set of filters based on original headers (for non-virtualized network packets) to allow the traffic from physical network to be filtered and mapped to instrument ports as discussed before. Allowing only virtualized network traffic of interest for processing by the second packet switch 500 will significantly reduce the workload required of the second packet switch 500 (or the number of resources needed for the packet switch 500).

In the illustrated embodiments, the processor 144 is communicatively coupled to the packet switch 500, which is a separate component from the processor 144. In other embodiments, the processor 144 may be implemented as a part of the packet switch 500. Also, in further embodiments, the packet switch 500 may be located outside the housing of the network switch device 100, and is communicatively coupled to the processor 144 located inside the housing of the network switch device 100. In some embodiments, each of the packet switch 140 and the packet switch 500 may be implemented using a high speed and/or high density ASIC. Using ASIC processor to implement the packet switch 140/500 is advantageous over FPGA processor because ASIC processor may be more powerful for handling packets filtering. Also, in some embodiments, the processor 144 may be implemented using a custom FPGA network processor. In some embodiments, the FPGA processor may be cheaper and/or use less power than a non-FPGA network processor.

In one or more embodiments, the network switch device 100 may optionally be configured to insert stripped header(s) to other part(s) of a packet. For example, in some embodiments, the processor 144 may receive a packet with an outer header (O), an inner header (I), and a payload (P), as follow: O-I-P. The processor 144 then strips the outer header, and may insert it to the end of the packet to obtain the format: I-P-O. The processor 144 then transmits the modified packet with the new format back to the network switch 140/500 for packet filtering. In some embodiments, the network switch 140/500 is configured to perform packet filtering based on the information in the header (I), and so the extra information in the outer header (O) at the end of the packet will not affect the filtering of the packet by the network switch 140/500. For example, the network switch 140/500 may perform packet filtering to identify HTTP packets, TCP packets, etc., and transmit them to the appropriate instrument port(s) according to pre-determined packet transmission scheme. In some embodiments, the modified packet with the format I-P-O is received by a network monitoring instrument that is communicatively coupled to an instrument port at the network switch device 100. The network monitoring instrument may use the information in the outer header (O) to analyze the network traffic, such as to re-generate the virtualized network traffic using addresses of the hosts in the outer header (O).

Also, in one or more embodiments, the network switch device 100 may optionally be configured to perform additional filtering on the packet after the header stripping. For example, in some embodiments, the processor 144 may receive a packet with an outer header (O), an inner header (I), and a payload (P)—i.e., with the format O-I-P. In such cases, the processor 144 may strip the outer header O so that the revised packet has the format I-P. The processor 144 may also process the packet to determine if there is any field in the header I, or between the header I and the payload P that is a specialized field. For example, the processor 144 may identify a value h1 in a specialized field in one packet, and a value h2 in the specialized field in another packet. In such cases, when transmitting the revised packet to the packet switch 140/500, the processor 144 may also be configured to transmit meta data associated with the values in the specialized field. In the above example, when transmitting the first packet with the value h1 in the specialized field, the processor 144 may also transmit meta data M1, to the packet switch 140/500. Similarly, when transmitting the second packet with the value h2 in the specialized field, the processor 144 may also transmit meta data M2, to the packet switch 140/500. When the packet switch 140/500 receives the packets with the meta data, the packet switch 140/500 may then perform filtering based on the information in the header I, and/or based on the meta data. For example, the packet switch 140/500 may pass the packet to one or more of the instrument ports based on a first filtering criteria that the packet is a HTTP packet, and a second filtering criteria that the meta data value is M1. In other examples, the first filtering criteria may be based on other types of packet (e.g., TCP packet, etc.).

Figure 6:
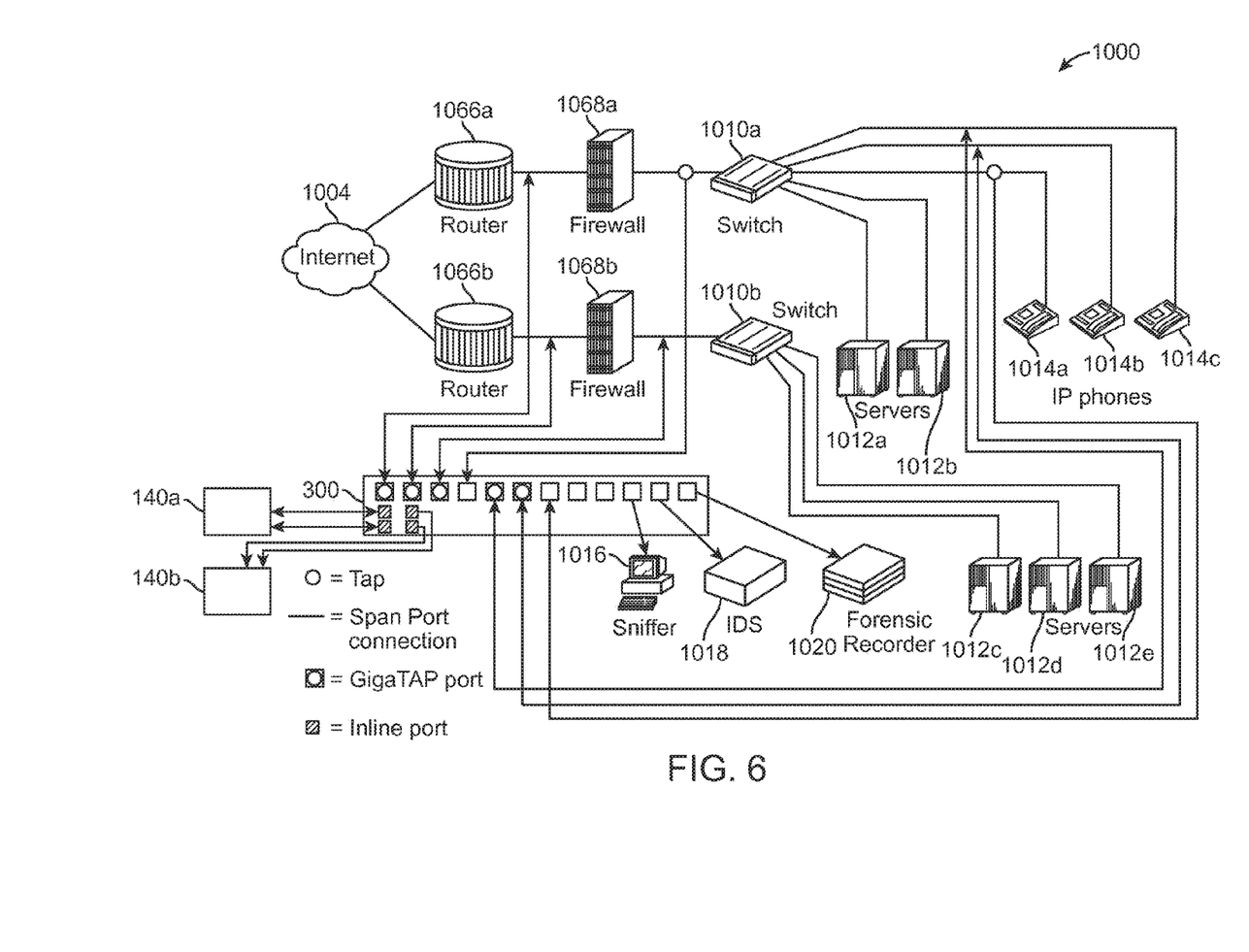
FIG. 6 illustrates a deployment of a network appliance in accordance with some embodiments.

FIG. 6 shows the deployment of the network switch device 100 in a network environment 1000 in accordance with some embodiments. The Internet 1004 is coupled via routers 1006*a-b* and firewalls 1068*a-b* to two switches 1010*a* and 1010*b*. Switch 1010*a* is coupled to servers 1012*a-b* and IP phones 1014*a-c*. Switch 1010*b* is coupled to servers 1012*c-e*. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066*a* and firewall 1068*a*, one or more non-pass through instruments between firewall 1068*a* and switch 1010*a*, one or more non-pass through instruments between router 1066*b* and firewall 1068*b*, and firewall 1068*b* and switch 1010*b*) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014*a-c* can be easily configured to be sent to an IDS 1018. It is also possible that traffic inside a particular IP phone 1014*a-c* connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Computer System Architecture

Figure 7:
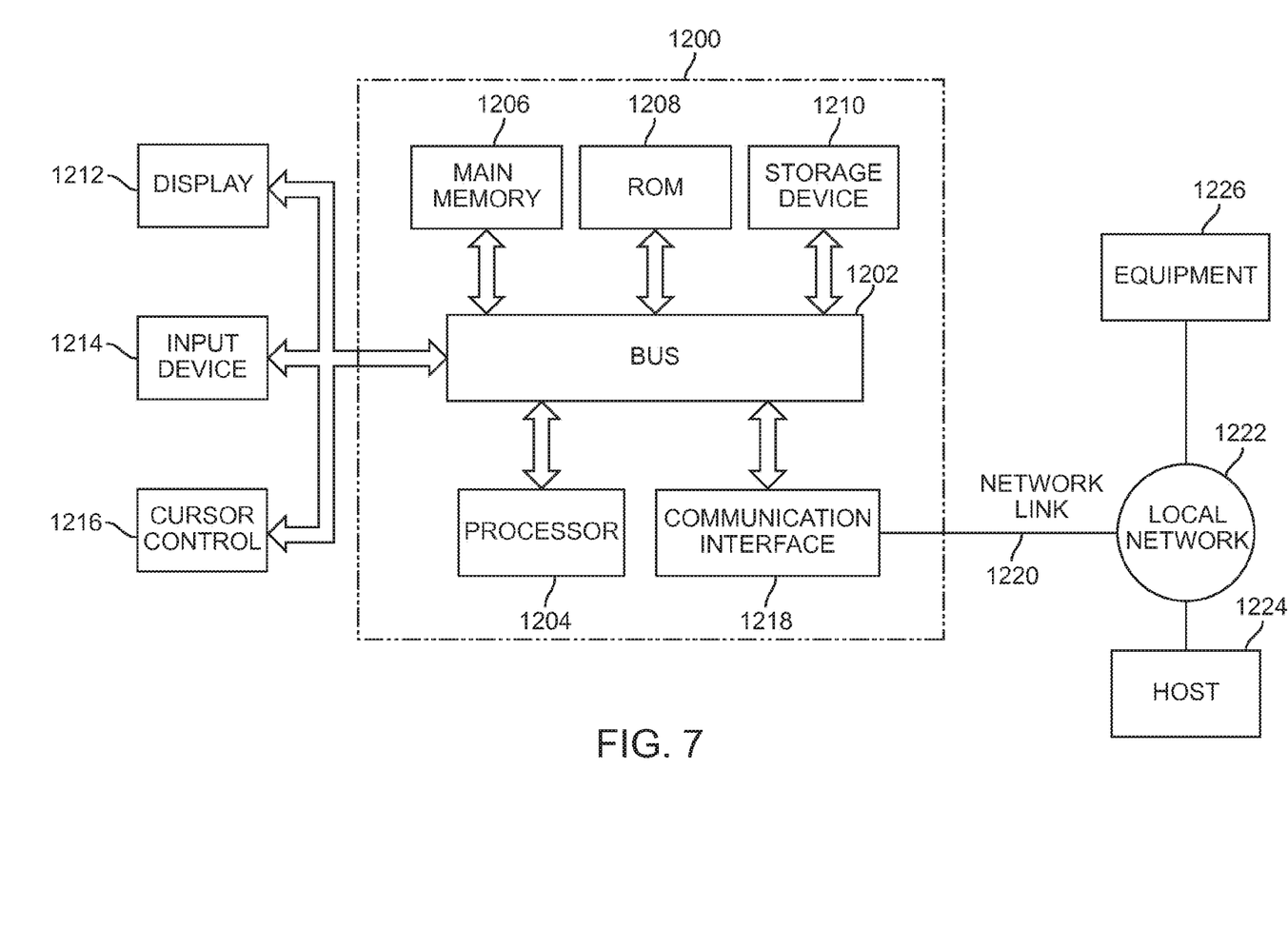
FIG. 7 illustrates an example of a computer system with which embodiments described herein may be implemented.

FIG. 7 is a block diagram that illustrates an embodiment of a computer system 1200 upon which embodiments described herein may be implemented. For example, in some embodiments, the computer system 1200 may be used to implement one or more functions of the processing unit 142, or one or more functions of the switch 140 described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

I claim:

1. A method comprising:
    receiving a packet that has a header at a port of a network switch appliance;
    determining whether to process the packet according to a first scheme or a second scheme, including determining that the packet should be processed according to the first scheme if the header is determined to have a tunnel format, or determining that the packet should be processed according to the second scheme if the header is determined not to have the tunnel format;
        wherein the first scheme includes stripping the header from the packet and then transmitting the packet without the header to an instrument port, and
        wherein the second scheme includes transmitting the packet with the header to the instrument port without first stripping the header; and
    processing the packet according to the first scheme or the second scheme based on the determination.

2. The method of claim 1, wherein the instrument port is configured for communicatively coupling to a network monitoring instrument.

3. The method of claim 1, further comprising:
    receiving information regarding a virtualized network;
    determining whether the packet is associated with the virtualized network based on the received information.

4. The method of claim 3, wherein the information includes one or more of an identification of a virtual machine host, an identification of a virtual machine workload, or a mapping between the virtual machine host and the virtual machine workload.

5. The method of claim 3, wherein the information is obtained from one or more of a data center controller, a virtual machine host, an openflow controller, a SDN controller, or a network switch.

6. The method of claim 1, wherein the packet includes an outer MAC header;
    wherein stripping the header from the packet includes removing the outer MAC header of the packet; and
    wherein transmitting the packet includes transmitting the packet to the instrument port after the outer MAC header has been removed from the packet.

7. The method of claim 1, wherein the packet includes an outer IP header;
    wherein stripping the header from the packet includes removing the outer IP header of the packet; and
    wherein transmitting the packet includes transmitting the packet to the instrument port after the outer IP header has been removed from the packet.

8. The method of claim 1, wherein the packet includes an outer UDP header;
    wherein stripping the header from the packet includes removing the outer UDP header of the packet; and
    wherein transmitting the packet includes transmitting the packet to the instrument port after the outer UDP header has been removed from the packet.

9. The method of claim 1, wherein the packet includes an outer MAC header, an outer IP header, an outer UDP header, and a VXLAN header; and
    wherein stripping the header from the packet includes removing the outer MAC header, the outer IP header, the outer UDP header, and the VXLAN header from the packet.

10. The method of claim 1, wherein the header stripping includes removing a tunnel header.

11. The method of claim 10, wherein the tunnel header includes a NVGRE header.

12. The method of claim 1, wherein the header stripping is performed by one or more processors configured to receive only packets with tunnel format.

13. The method of claim 1, the network switch appliance is configured to process the packet in an out-of-band configuration.

14. The method of claim 1, wherein the transmitting the packet includes:
    transmitting the packet to the instrument port;
    transmitting the packet to the instrument port and another instrument port;
    transmitting the packet received at the port and another packet received at a network port to the instrument port; or
    transmitting the packet received at the port and the other packet received at the other port to the instrument port and to the another instrument port.

15. An apparatus comprising:
    a network port to receive a packet;
    an instrument port to communicatively couple the apparatus to a network monitoring instrument; and
    a processing unit configured to:
        receive a packet that has a header via the network port;
        determine whether to process the packet according to a first scheme or a second scheme, including determining that the packet should be processed according to the first scheme if the header is determined to have a tunnel format, or determining that the packet should be processed according to the second scheme if the header is determined not to have the tunnel format;
            wherein the first scheme includes stripping the header from the packet and transmitting the packet without the header to an instrument port, and wherein the second scheme includes transmitting the packet having the header to the instrument port without first stripping the header; and process the packet according to the first scheme or the second scheme based on the determination.

16. The apparatus of claim 15, further comprising:
a port for receiving information regarding a virtualized network;
wherein the processing unit is configured for using the received information to determine whether the packet is associated with the virtualized network.

17. The apparatus of claim 15, further comprising a processor configured to perform the header stripping.

18. The apparatus of claim 17, wherein:
the packet includes an outer MAC header; and
the processor is configured to perform the header stripping by removing the outer MAC header of the packet before the packet transmission is performed to pass the packet to the one of the plurality of instrument ports.

19. The apparatus of claim 17, wherein:
the packet includes an outer IP header; and
the processor is configured to perform the header stripping by removing the outer IP header of the packet before the packet transmission is performed to pass the packet to the one of the plurality of instrument ports.

20. The apparatus of claim 17, wherein:
the packet includes an outer UDP header; and
the processor is configured to perform the header stripping by removing the outer UDP header of the packet before the packet transmission is performed to pass the packet to the one of the plurality of instrument ports.

21. The apparatus of claim 17, wherein:
the packet includes an outer MAC header, an outer IP header, an outer UDP header, and a VXLAN header; and
the processor is configured to perform the header stripping by removing the outer MAC header, the outer IP header, the outer UDP header, and the VXLAN header from the packet.

22. The apparatus of claim 17, wherein the processor is configured to receive only packets with tunnel format.

23. The apparatus of claim 15, wherein the header stripping includes removing one or more tunnel headers.

24. The apparatus of claim 23, wherein the one or more tunnel headers comprise one or more NVGRE headers.

25. The apparatus of claim 15, wherein the port is configured to receive the information from a data center controller, a virtual machine host, an openflow controller, a SDN controller, or a network switch.

26. The apparatus of claim 15, wherein the apparatus is configured to process the packet in an out-of-band configuration.

27. An apparatus comprising:
a network port for receiving packets, including a first packet having a tunnel format and a second packet not having the tunnel format;
an instrument port configured for communicatively coupling to a network monitoring instrument; and
a processing unit configured to:
determine whether to process a particular packet according to a first scheme or a second scheme, including determining that the particular packet should be processed according to the first scheme if a header is determined to have a tunnel format, or determining that the particular packet should be processed according to the second scheme if the header is determined not to have the tunnel format;
wherein the first scheme includes stripping the header from the particular packet and transmitting the packet without the header to the instrument port, and
wherein the second scheme includes transmitting the particular packet with the header to the instrument port without first stripping the header; and
process the particular packet according to the first scheme or the second scheme based on the determination.

28. The apparatus of claim 27, further comprising:
a switch module configured to transmit the particular packet to the instrument port.

* * * * *